United States Patent [19]

Baumgarten

[11] Patent Number: 5,332,379

[45] Date of Patent: Jul. 26, 1994

[54] EXTRUSION HEAD FOR SHEATHING ELONGATED OBJECTS

[75] Inventor: Wilfried Baumgarten, Pattensen, Fed. Rep. of Germany

[73] Assignee: Paul Troester Maschinenfabrik, Hanover, Fed. Rep. of Germany

[21] Appl. No.: 808,093

[22] Filed: Dec. 16, 1991

[30] Foreign Application Priority Data

Dec. 20, 1990 [DE] Fed. Rep. of Germany ....... 4040882

[51] Int. Cl.⁵ .............................................. B29C 47/94
[52] U.S. Cl. .................................. 425/107; 264/259; 425/113; 425/170; 425/205; 425/380; 425/382.3
[58] Field of Search ............. 264/39, 40.1, 171, 176.1, 264/209.8, 211.21, 259, 272.11; 425/107, 113, 114, 131.1, 133.1, 149, 170, 205, 206, 208, 380, 381, 382.3, 467

[56] References Cited

U.S. PATENT DOCUMENTS

| | | | |
|---|---|---|---|
| 2,676,356 | 4/1954 | Becker | 425/381 |
| 2,803,042 | 8/1957 | Lundh | 425/381 |
| 3,032,822 | 5/1962 | Maddock | 425/113 |
| 3,148,231 | 9/1964 | Spencer | 425/382.3 |
| 3,694,123 | 9/1972 | Cook et al. | 425/381 |
| 3,822,975 | 7/1974 | Hehl | 425/107 |
| 4,111,621 | 9/1978 | Otani | 425/113 |
| 4,349,324 | 9/1982 | Neff et al. | 425/149 |
| 4,579,515 | 4/1986 | Kawaguchi et al. | 425/149 |
| 4,832,588 | 5/1989 | Rasmussen | 425/114 |
| 5,064,364 | 11/1991 | Muller-Erwig | 425/114 |

FOREIGN PATENT DOCUMENTS

| | | | |
|---|---|---|---|
| 225206 | 11/1959 | Australia | 425/113 |
| 59-187831 | 10/1984 | Japan | 425/113 |
| 93596 | 3/1922 | Switzerland | 425/113 |
| 808283 | 2/1959 | United Kingdom | 425/113 |

*Primary Examiner*—Charles S. Bushey
*Attorney, Agent, or Firm*—Robert E. Burns; Emmanuel J. Lobato

[57] ABSTRACT

An extrusion head for sheathing elongate objects such as cables has a housing with an elongate bore in which there is a hollow mandrel through which is passed the object to be sheathed. At the discharge end of the mandrel there is a forming tool made up of an annular forming tool part on the mandrel and a concentric forming tool part at the adjacent end of the bore of the housing. An extruder connected to the extrusion head housing forces sheathing material into the bore of the housing and out through the forming tool to form a sheath on the cable or other object as it is passed through the hollow mandrel. A rotor which is rotatable on the mandrel has a screw thread web of decreasing height for propelling sheathing material toward the forming tool. There are lubricated radial seals between the rotor, mandrel and housing. For applying a double layer sheath, there are two entrusion heads interconnected one behind another and supplied with sheathing material by two extruders. Alternatively, an extrusion head has a smaller hollow mandrel inside a larger hollow mandrel and a three part forming tool with one part on the discharge end of the smaller mandrel, a second part on the discharge end of the larger mandrel and a third part at the end of the bore in the housing. There are two extruders of which one feeds sheathing material to the space between the mandrels and the other feeds material to the bore in the housing.

11 Claims, 4 Drawing Sheets

EXTRUSION HEAD FOR SHEATHING ELONGATED OBJECTS

The invention relates to an extrusion head for sheathing elongated objects such as tubes, cables, cylinder cores, reinforced hose and the like with an extruded mass comprising a housing with a side connection for the extruder, a hollow guide core connected fast with the housing and a conveyor screw rotor surrounding the guide core.

BACKGROUND OF THE INVENTION

An extrusion head of this kind is known from GB-PS 11 59 453.

For the production of sheathed elongated objects such as insulated tubes, sheathed cable, rubber cylinders, sheathed armored hose and the like, a plastic mass for the sheathing, usually a plastic or a rubber mixture, must be applied to the inner part of the product, the tube core, the profiled core, the cable core, the cylinder core or a tube. This is possible with extrusion heads through which the product to be sheathed is drawn and on which the plastic or rubber mixture is flowed by means of an extruder connected to the side of the extrusion head.

In carrying out this sheathing, there are two basic difficulties, namely the uniform flow of the inner portions for the purpose of obtaining a uniform wall thickness of the sheathing on the circumference and the homogenous flowing together of the two streams of material flowing around the core. The first problem is naturally greater when the sheathing material is difficult to work and still greater when the diameter of the sheathing and thus also of the extrusion head is greater. Especially in the sheathing of large cables and in the coating of cylinder cores with a rubber mixture, this problem is not easily solved. The second problem is still more serious since even with correct production procedure there occurs in the location where the two streams flow together an almost imperceptible inhomogeneity which impairs the quality of the end product in this location as, for example, limited strength, danger of bursting, flaws in the outer surface and the like. The reason for this lies in the unmistakably bad (molecular) union of the mass particles of the two streams of extrudant flowing together.

Improvement of the temperature control of the extrusion head is of as little help as the introduction of projections for pressing the portions of the mass together (DE-AS 12 45 100) or the use of a rotating ring which with its inner face engages the outer surface of the extrudant and smooths out the projections of the stream of extrudant (Ch-PS 347 345). But not only with a rotating outer ring as in Ch-PS 347 345 it has been sought to make the sheathing uniform also with a rotating core in the shear extrusion head which acts on the material forming the sheathing as described in the publication "Drahtwelt" 10-1979, page 416. This rotating core has a fully smooth outer surface. The action is intensified when, according to GB-PS 11 59 453 the rotating core is provided with a spiral. However here the above mentioned non-homogenous projections where the streams of extrudant flow together in the extrusion head are made helical so that these non-homogenous projections in a given length of the end product are longer than the projections running parallel to the axis. Hence the impairment of the product is increased.

Likewise in EP O 231 976 A 2 there is disclosed a rotating core with a screw which extends substantially to the tip of the rotating mandrel whereby the non-homogenous projections remaining in the product become still more distinct. Here there is provided on the rotating mandrel an axial packing between the stationary central tube and the rotating mandrel. Because of the high pressure forces, such axial packing is scarcely reliable and develops undesirable heat by friction which with polymerizable mixtures must be avoided.

SUMMARY OF THE INVENTION

The invention avoids the disadvantages of the state of the art. It is the object of the invention to provide a simple construction of the extrusion head which produces a fully homogenous sheathing with simple means.

The extrusion head in accordance with the invention is characterized in that the height of the web of the screw on the rotor decreases in a forward direction from the inlet of the material and that the gap width between the upper edge of the screw web and the inner wall of the housing increases in a forward direction.

This extrusion head produces a sheathing which has neither lines of non-homogeneity parallel to the axis or spiral. Through the decreasing height of the screw web and through the increasing gap width between the upper edge of the screw web and the inner wall of the housing there is obtained a flow pattern which causes the grain of the remaining edges of the previously divided strand fully to disappear. The forced rotation of the mass is gradually changed to flow in an axial direction and indeed this is true of the outer portion as well as the inner portion of the sheathing so that the extrudant on the outer side has a pure axial flow earlier than that on the inner side. Through this flow relationship a fully homogeneous sheathing is extruded.

This effect can be still further improved by altering the spacing of the webs of the screw, the flank angle, the web width and/or the web depth in a forward direction. Also this can essentially contribute to avoiding the helical flow marks produced by known extrusion heads.

It is advantageous when the rotor is sealed with a radial sealing with respect to the housing and with respect to the stationary hollow mandrel. This radial sealing avoids the heating caused by axial sealing and its unfavorable effect on the extrudant. This contributes to avoiding non-homogeneity.

It is advantageous when the radial sealing is lubricated by a lubricant which is fed through bores in the housing and in the hollow mandrel.

It can be advantageous when the lubricant used combines with the extrudant and/or produces a lubricant or an adhesive. This is then applied to the extrudant and indeed to the inner wall of the sheathing shortly before contact with the core or shaft.

For applying a double or multi-layer sheathing, it is advantageous to connect two extrusion devices, provided with rotors, one behind another, which are fed from different extruders and preferably are arranged in a common housing. However in many cases it is sufficient to arrange in front of the rotor in the extrusion head a simple sheathing head without rotating parts.

However in many cases it is also sufficient when for producing a multiple sheathing, one injection device with a rotor and one without a rotor are arranged one behind another and preferably integrated in a common housing. In this case it is advantageous when the hollow mandrels are arranged concentrically in one another and carry a forming tool on the free end. The housing is thereby advantageously formed of two housing parts arranged one behind another, of which one housing part is a continuation of the hollow mandrel which is surrounded by a rotor, the housing part and hollow mandrel being formed as one piece or the hollow mandrel being attached to or installed in the housing part.

In order to obtain a constant uniform sheathing quality, it is advantageous to provide pressure measuring means in the extrudant inlet and/or outlet and a pressure controlled rate of rotation of the rotor and/or the extruder screw.

BRIEF DESCRIPTION OF DRAWINGS

The nature of the invention will be more fully understood from the following description of preferred embodiments shown schematically by way of example in the accompanying drawings in which.

DESCRIPTION OF PREFERRED EMBODIMENTS

Figure 1:
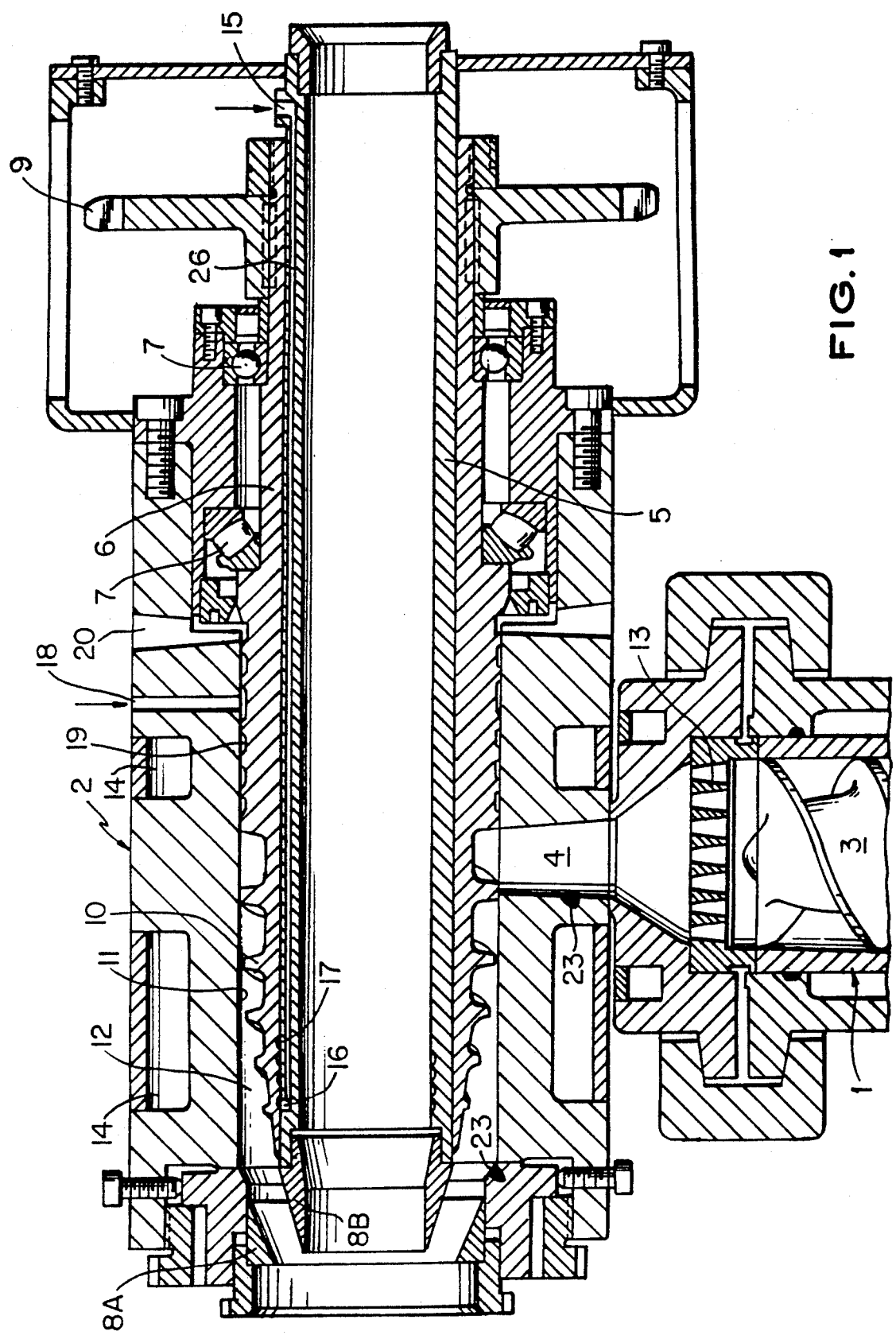
FIG. 1 is an axial section through an extrusion head in accordance with the invention.
Figure 2:
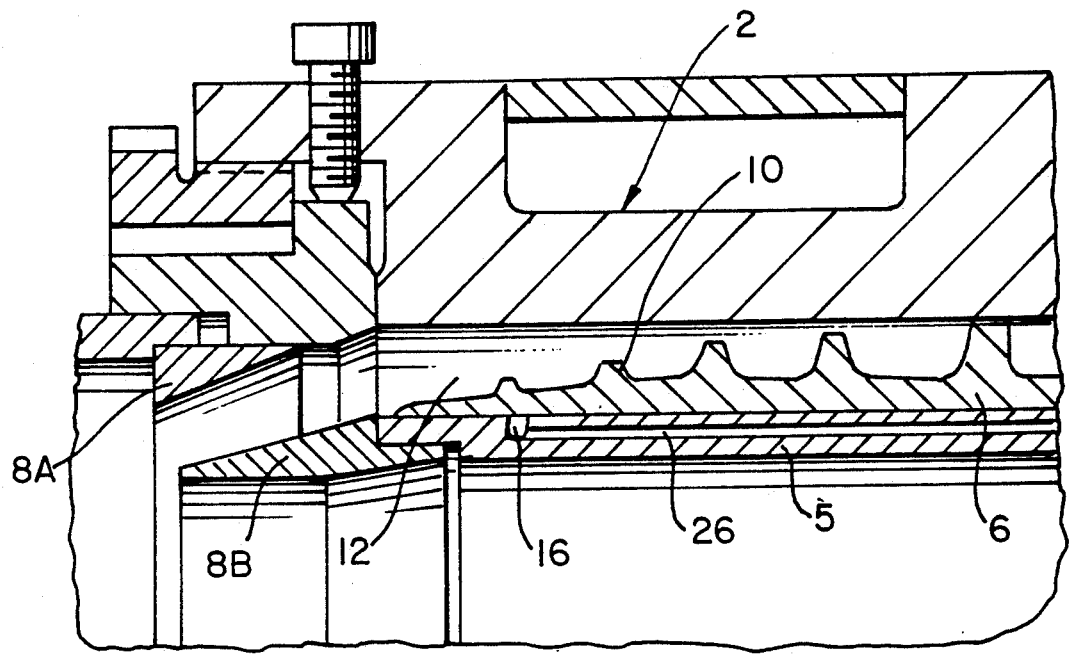
FIG. 2 is an enlarged detail of FIG. 1, namely the forward end of the rotors with means for lubricating the forward rotor end.
Figure 3:
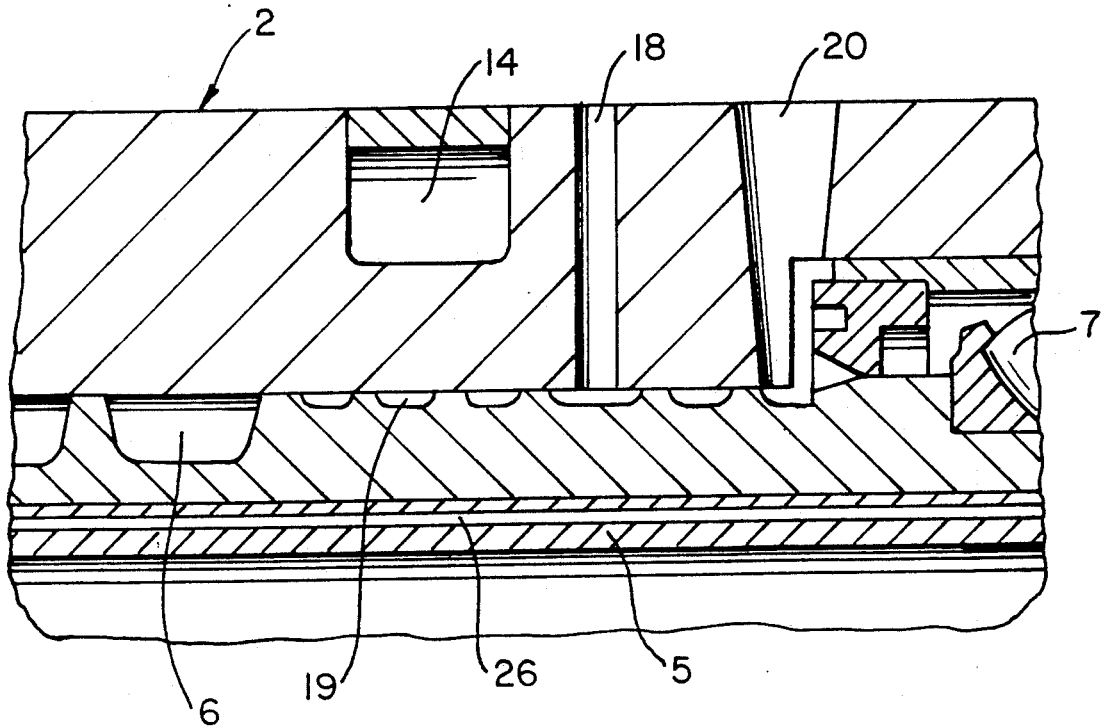
FIG. 3 is an enlarged detail of FIG. 1 showing the lubrication of the rear end of the rotor.

In the embodiment shown in FIGS. 1 to 3, an extruder 1, provided with appropriate feed and drive means (not shown), is attached to the housing 2 of the extrusion head. The feeding screw 3 of the extruder forces the material contained in the extruder through the channel 4 into the interior of the extrusion head housing 2. In the housing 2, a rotor 6 is rotatably supported by bearing 7 which encircles a hollow mandrel 5 that is fast with the housing 2. Through this hollow mandrel 5 an elongate object that is to be sheathed enters at the right side and is sheathed at the left side by extrudant which is forced between forming tool parts 8A and 8B onto the object. On its way from the channel 4 to the forming tool parts 8A and 8B, the extrudant is subjected to a working by the rotor 6 which is driven by a gear 9 meshing with a suitable drive pinion (not shown) and which on its outer side carries a single or multiple screw web 10. This is located in the cylindrical interior of the extrusion head housing 2. The extrudant is forwarded through the channel in the space between the rotor 6 and the cylindrical inner wall 11 of the housing 2 through pressure generated in the extruder 1. As the wall thickness of the rotor 6 decreases in a direction toward the forming tool parts 8A and 8B and as, additionally, the height of the screw web 10 also decreases, the extrudant is forwarded into an annular space 12 of which the annular cross section increases so that the space between the outer edge of the screw web 10 and the inner wall 11 of the housing 2 becomes greater in a forward direction.

Through this geometric formation of the rotor and of the screw web provided on its outer side, there is produced in the extrudant, in addition to the movement in a forward direction toward the left through the decreasing screw web 10, an additional component of movement which produces in this space 12 an additional mixing which destroys all traces of inhomogeneity which can result through the forwarding of the extrudant by the first portion of the screw in which the outer edge of the screw web is still close to the cylindrical inner wall 11 of the housing 2.

The extruder can be provided with a sieve 13, which is desirable for holding back any foreign bodies or inhomogeneity. The extrusion head housing 2 can be provided with temperature control channels 14 which can provide warming of the extrudant but also can remove any excess heat.

For the operation of this extrusion head, it is essential for the rotor 6 to be sufficiently lubricated with respect to the hollow mandrel 5 and with respect to the extrusion head housing 2.

For lubrication of the rotor 6 with respect to the hollow mandrel 5, a lubricant supplied to an inlet 15 is forced through a longitudinally extending channel 16 in the hollow mandrel 5 to an annular channel 16 which is adjacent the inner forming tool 8B. In the cylindrical inner wall of the rotor 6 in the region of the annular channel 16 there are formed circumferential grooves 17 or grooves of a thread through which excess lubricant is led off to the right through the space between the rotor 6 and the hollow mandrel 5.

For the lubrication of the rotor 6 with respect to the housing 2 there is provided in the housing 2 a supply channel 18 through which the lubricant is forced into the space between the rotor 6 and the inner wall 11 of the housing 2. In the outer surface of the rotor there is cut a thread 19 which prevents entry of the lubricant into the space 12 filled with extrudant and discharges the lubricant into a space 20 provided in the housing 2.

The lubricant and the grooves 17 and 19 provide radial seals between the rotor and the hollow mandrel and between the rotor and the housing. In accordance with the invention a special lubricant can be used for both radial seals. The outer seal can advantageously be filled with a limited dosage of molten mass which is mixture-compatible or so called stabilized. This can be the same plastic material that is used for the sheathing. For rubber mixtures it can, for example, be a low melting point polyethylene. For the inner seal, besides the above mentioned mass, it is possible to substitute a permanent lubricant such as graphite or $MoS_2$ so that a continual feeding of the lubricant is not necessary. However for a continual feeding, lubricating parting compounds such as grease, oil, chemicals and the like can be used if the sheathing material is easy to work, or a lubricating adhesive can be used when it is desirable to make the sheathing especially fast to the core. In this case such material is conveyed toward the left, i.e. in the extrusion direction. These chemical means can also be necessary for a secure molecular bond between the sheathing mixture and the metal core. This is especially advantageous for the sheathing of cylinders because it renders unnecessary a special operation of core preparation, For the feeding of the lubricant it is also possible to use a smaller additional extruder so that this adhesive layer can be produced with an exact definite thickness. This adhesive layer will in all cases be relatively thin.

There is also the possibility that the lubricating means can be led in both directions, i.e. in the extrusion direction as well as also in the opposite direction.

Figure 4:
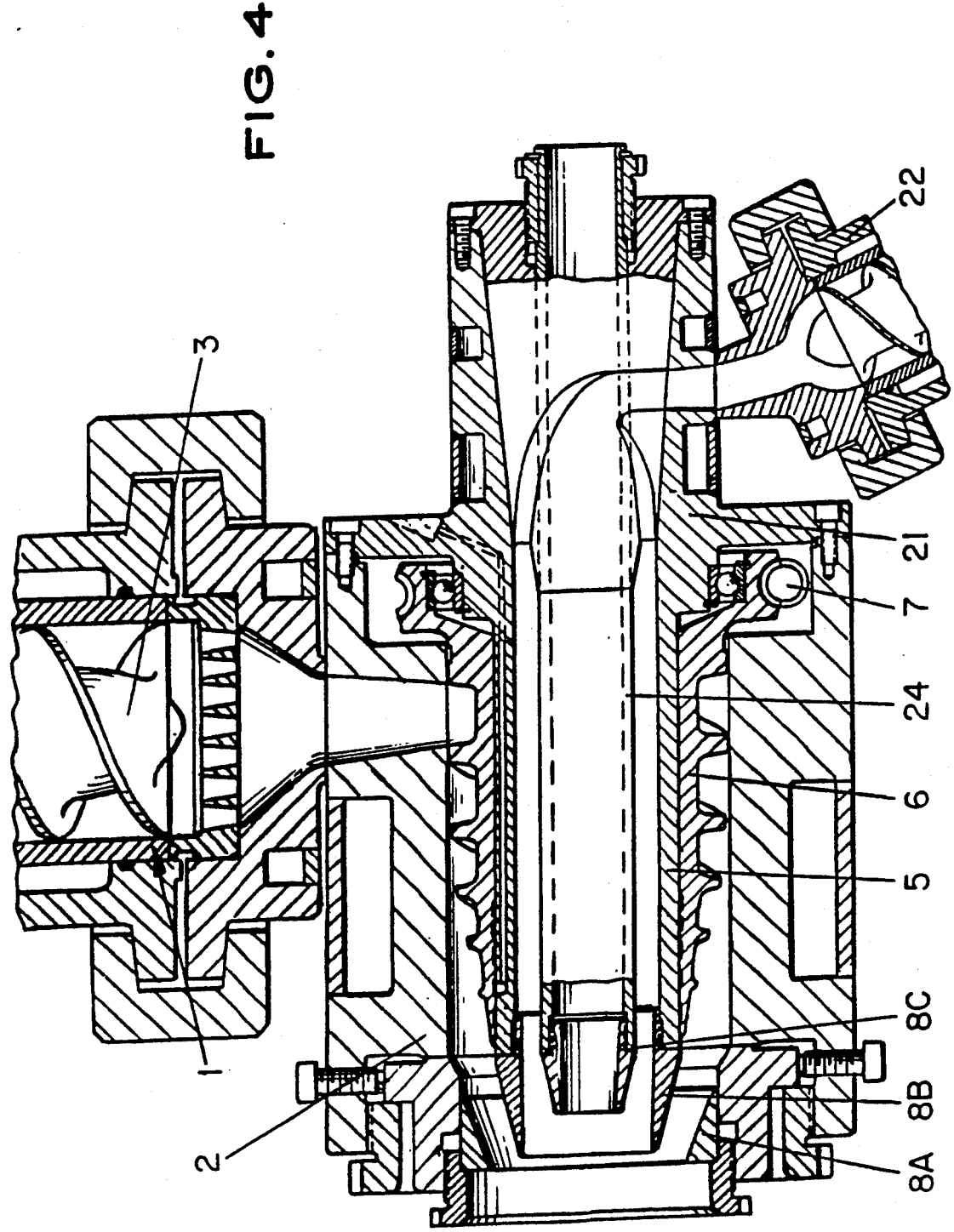
FIG. 4 is an axial section of an extrusion head for producing a double-wall sheathing, which has one rotor.

If it is desired to apply two layers of sheathing to the core, it is advantageous to arrange two extrusion heads one behind another as illustrated in FIG. 4 where, in front of the extrusion head 2, which is fed by the extruder 1, there is still a further extrusion head 21 which is fed from an extruder 22.

These two extrusion heads are advantageously integrated in a single extrusion head. Thereby it is advantageous when the hollow mandrels 24 and 5 are arranged concentrically in one another and on their free ends carry parts 8B and 8C of the forming tool. The hollow mandrel is thereby advantageously formed of two mandrel parts 5 and 24 arranged concentrically in one another, of which the mandrel part 24 extends inside the mandrel part 5 which is surrounded by the rotor 6. The housing is advantageously composed of two housing parts 2 and 21 arranged one behind the other of which the housing part 21 extends in the housing part 2 and supports the hollow mandrel part 5. In this construction, an inner layer of sheathing is applied to the core by material supplied by the extruder 22 and passing between forming tool parts 8B and 8C while a second layer of sheathing is applied by material fed by the extruder 1 and passing between forming tool parts 8A and 8B.

Figure 5:
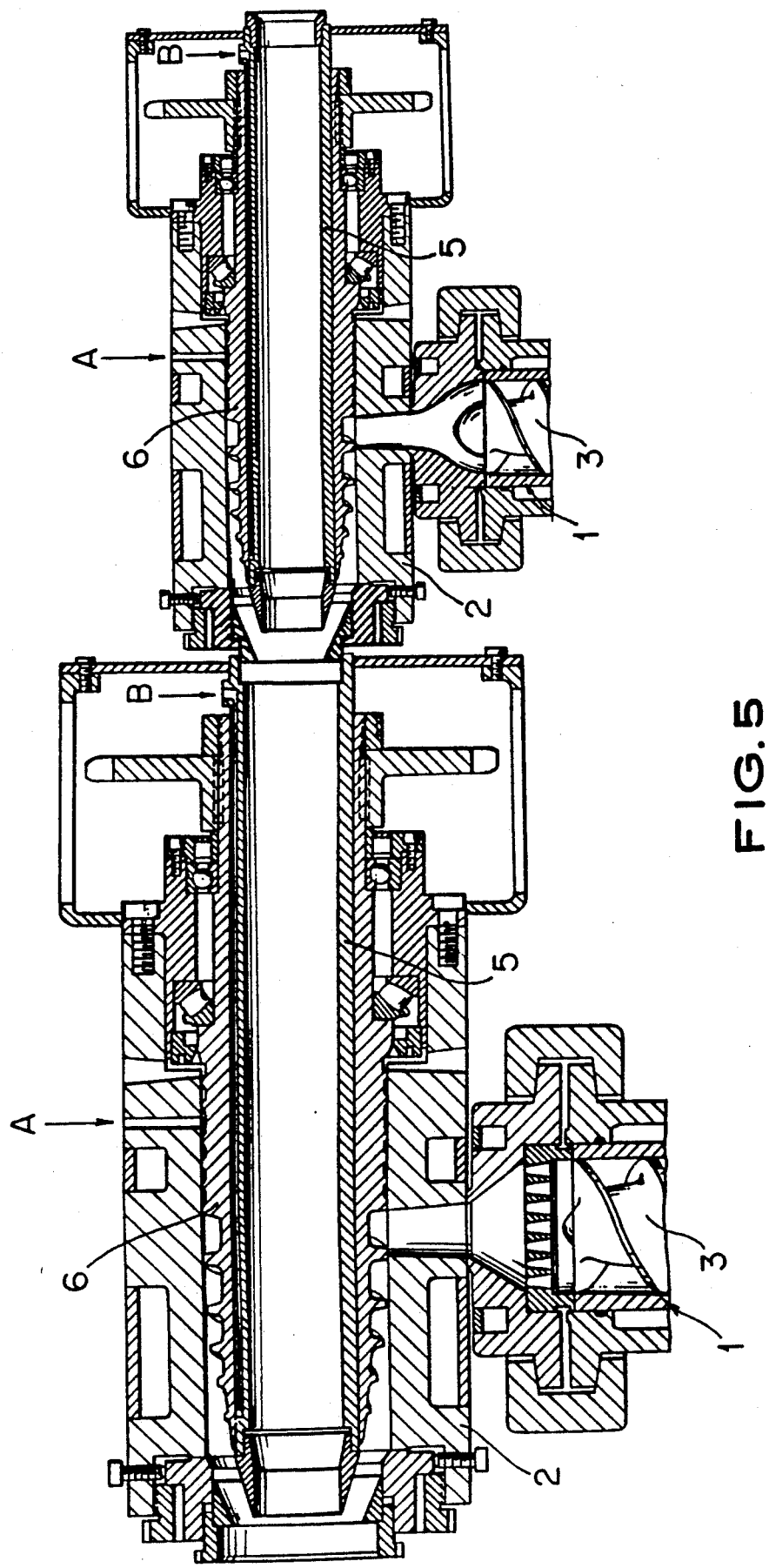
FIG. 5 is an extrusion head for producing a double-wall sheathing with two rotors.

Another possibility is shown in FIG. 5 where two extrusion heads are fed by two separate extruders, each of the extrusion heads being provided with a hollow mandrel surrounded by a rotor, one extrusion head being arranged behind the other so that a sheathed core produced by the right hand extruder shown in FIG. 5 passes through the hollow mandrel 5 of the left hand extrusion head which is fed by a separate extruder and applies a second layer of sheathing. Thus, with the embodiments shown in FIGS. 4 and 5 a double sheathed object can be produced with sheathing of desired thickness.

It is advantageous when pressure sensors 23 are provided in the channel 4 between the extruder and the extrusion head and immediately in advance of the forming tool part 8A (FIG. 1) and are connected with means for regulating the rate of rotation of the rotor 6 and/or the rate of rotation of extrusion screw 3.

It is especially advantageous when the screw web 10 does not extend over the full length of the rotor but only over a driving part which is spaced from the free end of the rotor. This achieves a particularly homogenous product. The space preferably equals about a third of the rotor length.

What I claim is:

1. An extrusion head for sheathing elongate objects with an extruded mass, comprising
   a housing having an elongate bore and an opening in a side of said housing,
   a hollow mandrel disposed concentrically in said bore and affixed to said housing with an annular space between said mandrel and said housing, said mandrel being of size for passage therethrough of an object to be sheathed,
   a forming tool at a discharge end of said hollow mandrel, said forming tool comprising an annular forming tool part on said discharge end of said hollow mandrel and an annular forming tool part at an end of said bore of said housing,
   an extruder for forcing sheathing materials through said opening in a side of said housing and into said annular space between said mandrel and said housing and out between said forming tool parts as a sheath on an object passing through said hollow mandrel,
   a rotor disposed in said annular space and rotatable on said hollow mandrel, said rotor having on its circumference a screw thread web for exerting a force on said material in a direction toward said forming tool,
   said housing being provided with a channel for supplying lubricant between an outer surface of said rotor and an inner surface of said bore of said housing,
   in which at least one circumferential groove is provided in an outer surface of said rotor in the vicinity of said lubricant supply channel in said housing, said groove being a helical groove for propelling lubricant in a direction away from said forming tool toward a discharge space in said housing,
   said web progressively decreasing in height and the radial space between said web and an inner wall surface of said bore of said housing progressively increasing in a direction toward said forming tool to produce flow of said material in an axial direction.

2. An extrusion head according to claim 1 in which said screw thread web ends at a location spaced from a forward end of said rotor.

3. An extrusion head according to claim 1, in which said mandrel has an annular groove in its outer circumference inside a forward end portion of said rotor and a longitudinally extending channel for supplying lubricant to said annular groove.

4. An extrusion head according to claim 3, in which annular grooves are formed in an inner peripheral surface of said rotor in the vicinity of said annular groove in said mandrel.

5. An extrusion head according to claim 3 in which a helical groove is formed in an inner peripheral surface of said rotor in the vicinity of said annular groove in said mandrel.

6. An extrusion head according to claim 1, further comprising means for sensing pressure of extrudant supplied by said extruder.

7. An extrusion head for sheathing elongate objects with an extruded mass, comprising
   a housing having an elongate bore,
   a hollow mandrel disposed in said bore and affixed to said housing, said mandrel being of a size for passage therethrough of a object to be sheathed,
   a forming tool at a discharge end of said hollow mandrel, said forming tool comprising an annular forming tool part at said discharge end of said hollow mandrel and an annular forming tool part at an end of said bore of said housing,
   an extruder for forcing sheathing material into said bore of said housing and between said forming tool parts as a sheath on an object passing through said hollow mandrel,
   a rotor rotatable on said hollow mandrel and having on its circumference a screw thread web,
   means for providing a radial seal between said rotor and said hollow mandrel, and
   means for providing a radial seal between said rotor and an inner wall surface of said bore in said housing, said means for providing a radial seal between said rotor and an inner wall surface of said bore in said housing comprises a channel in said housing for supplying lubricant to interfaces of an outer peripheral surface of said rotor and an inner peripheral surface of said bore of said housing and in which there is formed in said outer peripheral surface of said rotor in the vicinity of said channel in said housing a screw thread for propelling lubricant in a direction away from said forming tool.

8. An extrusion head according to claim 7, which said means for providing a radial seal between said rotor and said hollow mandrel comprises an annular groove in an outer circumferential surface of said hollow mandrel in the vicinity of a forward end portion of said rotor and a longitudinally extending channel in said hollow rotor for supplying lubricant to said annular groove.

9. An extruder according to claim 8, in which said rotor has in an inner peripheral surface a plurality of annular grooves in the vicinity of said annular groove in said hollow mandrel.

10. An extruder according to claim 8, in which said rotor has in an inner peripheral surface a helical groove in the vicinity of said annular groove in said hollow mandrel.

11. An extruder according to claim 7, in which said housing has an opening for receiving said lubricant propelled by said screw thread on said rotor.

* * * * *